United States Patent
Hsieh (10) Patent No.: US 12,498,430 B2
(45) Date of Patent: Dec. 16, 2025

(54) CONNECTION DETECTION DEVICE AND CONNECTION DETECTION METHOD

(71) Applicant: Coretronic Corporation, Hsin-Chu (TW)

(72) Inventor: Ching-Feng Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 279 days.

(21) Appl. No.: 18/343,722

(22) Filed: Jun. 28, 2023

(65) Prior Publication Data
US 2024/0003986 A1    Jan. 4, 2024

(30) Foreign Application Priority Data

Jun. 29, 2022  (CN) .......................... 202210756282.2

(51) Int. Cl.
*G01R 31/55*    (2020.01)

(52) U.S. Cl.
CPC .................... *G01R 31/55* (2020.01)

(58) Field of Classification Search
None
See application file for complete search history.

(56) References Cited

U.S. PATENT DOCUMENTS

| | | | | |
|---|---|---|---|---|
| 2006/0238303 A1* | 10/2006 | Loving | ................ | G06K 7/0008 340/10.3 |
| 2018/0027330 A1* | 1/2018 | Rand | .................... | G06F 13/387 381/309 |
| 2021/0364578 A1* | 11/2021 | Nishitani | ............... | G01R 31/69 |

FOREIGN PATENT DOCUMENTS

| | | | | |
|---|---|---|---|---|
| CN | 1207595 A | * | 2/1999 | .......... G01R 31/045 |
| CN | 113993273 | | 1/2022 | |
| TW | I321388 | | 3/2010 | |

OTHER PUBLICATIONS

English translation of CN-1207595-A (Year: 1999).*

* cited by examiner

*Primary Examiner* — Jermele M Hollington
(74) *Attorney, Agent, or Firm* — JCIPRNET (57) ABSTRACT

A connection detection device and a connection detection method for detecting a connection state between a first connector and a second connector are provided. The first connector includes detection pins. The second connector includes loop pins corresponding to the detection pins. The connection detection device includes a bias voltage generator, a detection circuit, and a processor. The bias voltage generator applies a reference bias voltage to the detection pins. The detection circuit detects bias values on the detection pins. When each bias value is shifted to a first bias value based on a connection loop formed between the detection pins and the loop pins, the detection circuit provides a first detection signal. When at least one of the bias values is not shifted to the first bias value, the detection circuit provides a second detection signal. The processor provides an alarm signal in response to the second detection signal.

18 Claims, 11 Drawing Sheets

CONNECTION DETECTION DEVICE AND CONNECTION DETECTION METHOD

CROSS-REFERENCE TO RELATED APPLICATION

This application claims the priority benefit of China application serial no. 202210756282.2, filed on Jun. 29, 2022. The entirety of the above-mentioned patent application is hereby incorporated by reference herein and made a part of this specification.

BACKGROUND

Technical Field

The disclosure relates to a connection detection device and a connection detection method, and more particularly to a connection detection device and a connection detection method for detecting a connection state between connectors.

Description of Related Art

Considering design requirements such as limitations of the size and the height of an electronic device, the electronic device may not be able to use only one circuit board to complete all functions of the electronic device. Therefore, based on the above design requirements, the electronic device may need to use multiple circuit boards to implement all the functions of the electronic device. Therefore, electrical connections between the circuit boards must be achieved through connectors and connecting lines, so that the entire electronic device can execute all the functions.

The circuit boards are electrically connected through the connectors and the connecting lines. If the connectors are not correctly connected, the electronic device cannot operate normally or may execute an abnormal operation, thereby causing damage to electronic elements in the electronic device. For example, the electronic device is, for example, a projector. If the connectors are not correctly connected, micro mirrors may collide due to an abnormal operation of a digital micro mirror device (DMD) in the electronic device, thereby damaging the digital micro mirror device. As such, it can be seen that how to provide a connection detection mechanism for detecting the connection state between the connectors is one of the research focuses of persons skilled in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a connection detection device and a connection detection method for detecting a connection state between connectors.

Other objectives and advantages of the disclosure can be further understood from the technical features disclosed in the disclosure.

To achieve one, a part, or all of the above objectives or other objectives, an embodiment of the disclosure provides a connection detection device. The connection detection device is used to detect a connection state between a first connector and a second connector. The first connector includes multiple detection pins. The second connector includes multiple loop pins corresponding to the detection pins. The connection detection device includes a bias voltage generator, a detection circuit, and a processor. The bias voltage generator is coupled to the detection pins of the first connector. The bias voltage generator applies a reference bias voltage to the detection pins. The detection circuit is coupled to the detection pins of the first connector. The detection circuit detects multiple bias values on the detection pins. When each of the bias values is shifted to a first bias value based on a connection loop formed between the detection pins and the loop pins, the detection circuit provides a first detection signal. When at least one of the bias values is not shifted to the first bias value, the detection circuit provides a second detection signal. The processor is coupled to the detection circuit. The processor provides an alarm signal in response to the second detection signal.

To achieve one, a part, or all of the above objectives or other objectives, an embodiment of the disclosure provides a connection detection method. The connection detection method is used to detect a connection between a first connector and a second connector. The first connector includes multiple detection pins. The second connector includes multiple loop pins corresponding to the detection pins. The connection detection method includes the following steps. A reference bias voltage is applied to the detection pins by a bias voltage generator. Multiple bias values on the detection pins are detected by a detection circuit. When each of the bias values is shifted to a first bias value based on a connection loop formed between the detection pins and the loop pins, a first detection signal is provided by the detection circuit. When at least one of the bias values is not shifted to the first bias value, a second detection signal is provided by the detection circuit. An alarm signal is provided by the processor in response to the second detection signal.

Based on the above, the embodiments of the disclosure include at least one of the following advantages or effects. In the connection detection device and the connection detection method of the disclosure, the reference bias voltage is applied to the detection pins by the bias voltage generator, and the bias values on the detection pins are detected by the detection circuit. When each of the bias values is shifted to the first bias value based on the connection loop formed between the detection pins and the loop pins, the detection circuit provides the first detection signal. On the other hand, when at least one of the bias values is not shifted to the first bias value, the detection circuit provides the second detection signal. The processor provides the alarm signal in response to the second detection signal. In this way, the connection detection device and the connection detection method of the disclosure can detect the connection state between the connectors through the shift of the bias values, and provide the alarm signal accordingly.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
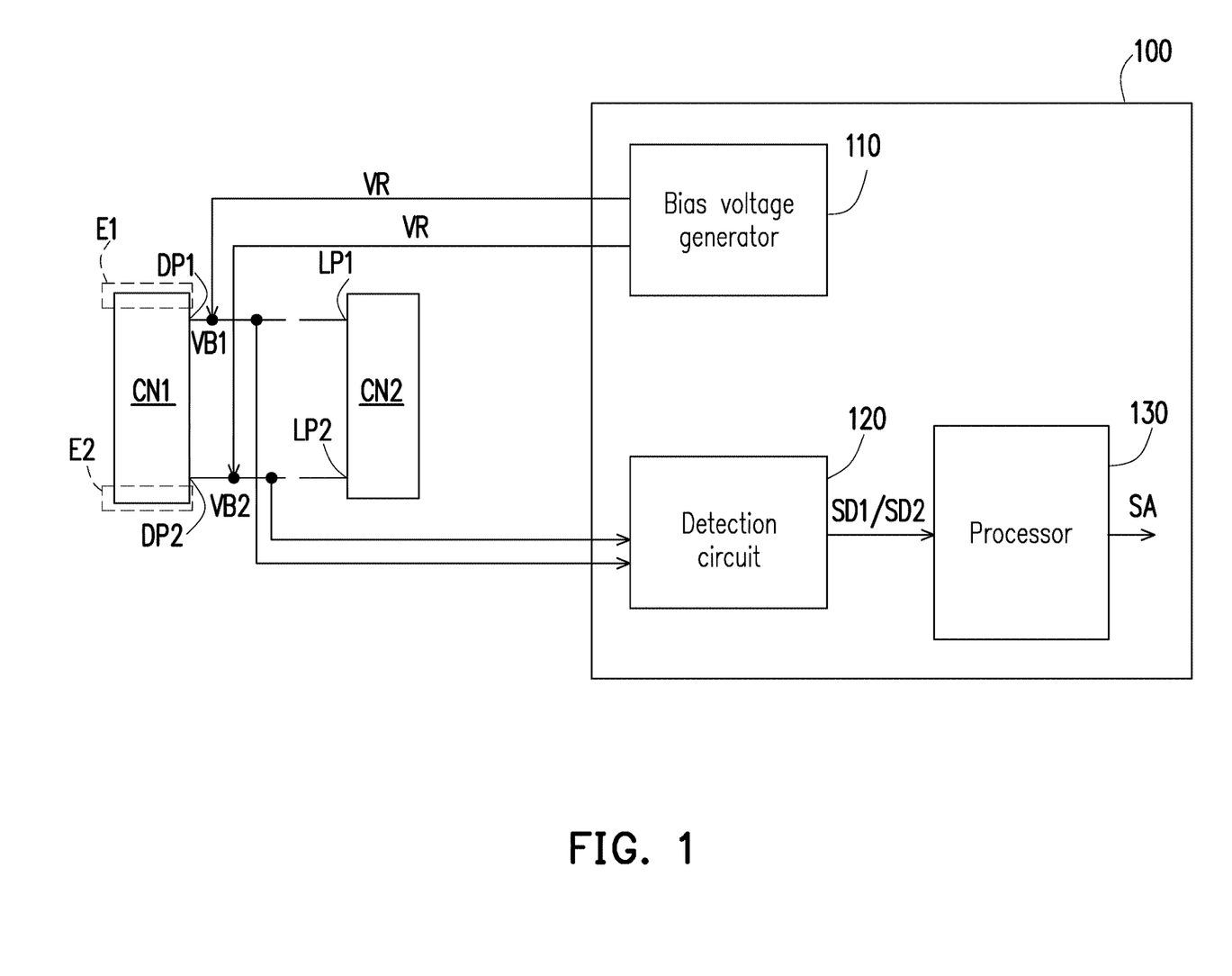
FIG. 1 is a schematic diagram of a connection detection device according to a first embodiment of the disclosure.

Please refer to FIG. 1. FIG. 1 is a schematic diagram of a connection detection device according to a first embodiment of the disclosure. In the embodiment, a connection detection device 100 is used to detect a connection state between a first connector CN1 and a second connector CN2 of an electronic device. For example, the first connector CN1 corresponds to a first circuit board (not shown), and the second connector CN2 corresponds to a second circuit board (not shown). The first circuit board and the second circuit board may be electrically connected through the first connector CN1 and the second connector CN2. The first connector CN1 includes detection pins DP1 and DP2. The second connector CN2 includes loop pins LP1 and LP2. The loop pins of the second connector CN2 correspond to the detection pins of the first connector CN1. For example, when the first connector CN1 and the second connector CN2 are correctly connected, the detection pin DP1 is correspondingly connected to the loop pin LP1, and the detection pin DP2 is correspondingly connected to the loop pin LP2.

For the convenience of description, the embodiment is exemplified by using the two detection pins DP1 and DP2 and the two loop pins LP1 and LP2. The number of detection pins and the number of loop pins of the disclosure may be multiple, and other detection pins of the first connector CN1 may also be correspondingly connected to other loop pins of the second connector CN2.

In the embodiment, the connection detection device 100 includes a bias voltage generator 110, a detection circuit 120, and a processor 130. The bias voltage generator 110 is coupled to the detection pins DP1 and DP2 of the first connector CN1. The bias voltage generator 110 is used to respectively apply a reference bias voltage VR to the detection pins DP1 and DP2. The detection circuit 120 is coupled to the detection pins DP1 and DP2 of the first connector CN1. The detection circuit 120 is used to detect bias values VB1 and VB2 on the detection pins DP1 and DP2. Once the detection pins DP1 and DP2 and the loop pins LP1 and LP2 are correctly connected, the detection pins DP1 and DP2 and the loop pins LP1 and LP2 will form a connection loop to shift the bias values VB1 and VB2 on the detection pins DP1 and DP2 to first bias values. The detection circuit 120 provides a first detection signal SD1 to the processor 130 based on the shift of the bias values VB1 and VB2. The processor 130 is coupled to the detection circuit 120.

On the other hand, when at least one of the bias values VB1 and VB2 on the detection pins DP1 and DP2 is not shifted to the first bias value, it means that the detection pins DP1 and DP2 and the loop pins LP1 and LP2 are not correctly connected. The detection circuit 120 provides a second detection signal SD2 to the processor 130. The processor 130 provides an alarm signal SA in response to the second detection signal SD2.

In the embodiment, the connection detection device 100 can detect the connection between the first connector CN1 and the second connector CN2 through the shift of the bias values VB1 and VB2, and provide the alarm signal SA according to the incorrect connection between the first connector CN1 and the second connector CN2. In this way, malfunction of the electronic device caused by incorrect connection between the first connector CN1 and the second connector CN2 can be avoided.

In the embodiment, the processor 130 is, for example, a central processing unit (CPU), other programmable general-purpose or specific-purpose microprocessors, digital signal processors (DSPs), programmable controllers, application specific integrated circuits (ASICs), programmable logic devices (PLDs), other similar devices, or a combination of the devices, which can load and execute a computer program.

In the embodiment, the first connector CN1 has short edges E1 and E2. The short edge E1 is opposite to the short edge E2. The detection pins DP1 and DP2 are respectively a pin closest to one of the short edge E1 and the short edge E2. Taking the embodiment as an example, the detection pin DP1 is the pin closest to the short edge E1. The detection pin DP2 is the pin closest to the short edge E2. Similarly, the loop pins LP1 and LP2 are respectively a pin closest to one of two short edges of the second connector CN2. When the detection pins DP1 and DP2 and the loop pins LP1 and LP2 are correctly connected, the other pins of the first connector CN1 and the other pins of the second connector CN2 are also properly connected.

In some embodiments, the connection detection device 100 may be built in the electronic device. In some embodiments, the connection detection device 100 may also be externally connected to the electronic device. The disclosure does not specifically limit the configuration position of the connection detection device 100. The electronic device may be, for example, an electronic product such as a projection device, a personal computer, a tablet computer, or a smart phone.

Figure 2:
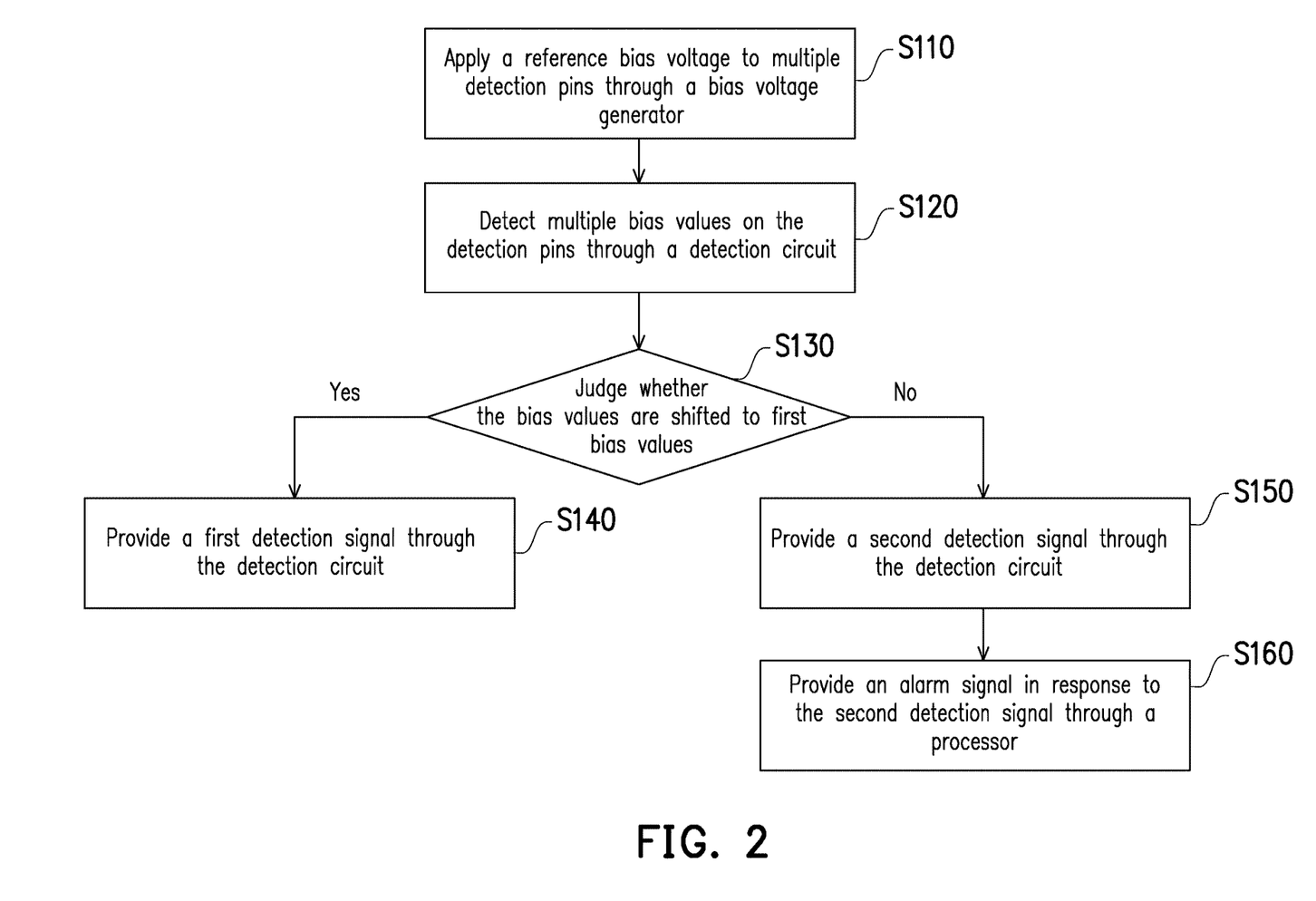
FIG. 2 is a flowchart of a connection detection method according to an embodiment of the disclosure.

Please refer to FIG. 1 and FIG. 2 at the same time. FIG. 2 is a flowchart of a connection detection method according to an embodiment of the disclosure. In the embodiment, the connection detection method is used to detect the connection between the first connector CN1 and the second connector CN2. The connection detection method is applicable to the connection detection device 100. In Step S110, the bias voltage generator 110 applies the reference bias voltage VR to the detection pins DP1 and DP2. In Step S120, the detection circuit 120 detects the bias values VB1 and VB2 on the detection pins DP1 and DP2. In Step S130, the detection circuit 120 judges whether the bias values VB1 and VB2 are shifted to the first bias values. When the bias values VB1 and VB2 are both judged to be shifted to the first bias values, in Step S140, the detection circuit 120 provides the first detection signal SD1 to the processor 130. On the other hand, when at least one of the bias values VB1 and VB2 is not shifted to the first bias value, in Step S150, the detection circuit 120 provides the second detection signal SD2 to the processor 130. In Step S160, the processor 130 provides the alarm signal SA in response to the second detection signal SD2. The implementation detail of Steps S110 to S160 has been clearly explained in the embodiment of FIG. 1, so there will be no repetition.

Figure 3:
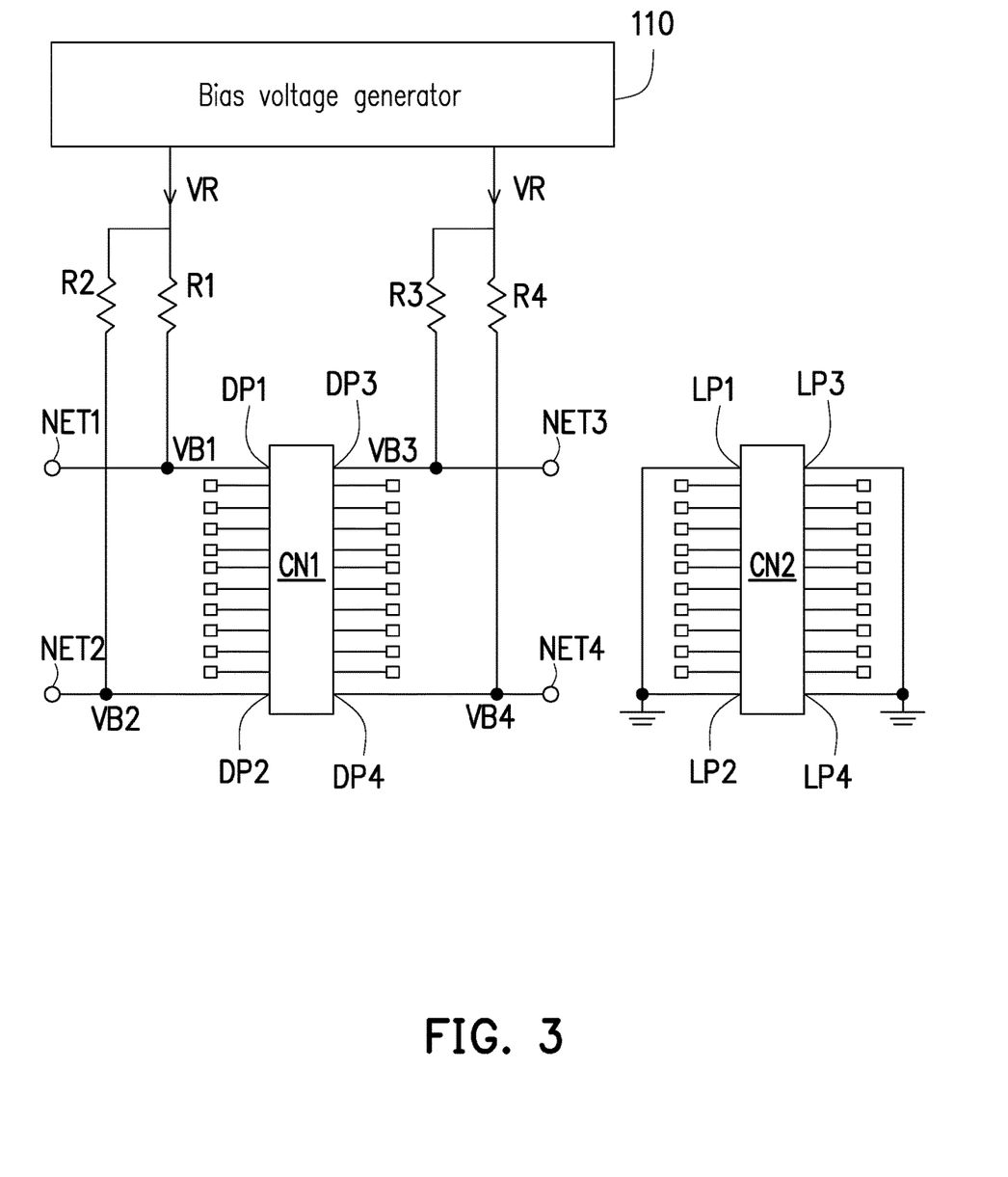
FIG. 3 is a schematic diagram of operations of a first connector, a second connector, and a bias voltage generator according to the first embodiment of the disclosure.

Please refer to FIG. 1 and FIG. 3 at the same time. FIG. 3 is a schematic diagram of operations of a first connector, a second connector, and a bias voltage generator according to the first embodiment of the disclosure. In the embodiment, the first connector CN1 includes multiple communication pins (not labelled) and detection pins DP1 to DP4. The second connector CN2 includes multiple communication pins (not labelled) and loop pins LP1 to LP4. In the embodiment, the communication pins are pins disposed between any two of the detection pins DP1 to DP4 and any two of the loop pins LP1 to LP4. The communication pins are used to transmit signals. In the embodiment, the connection detection device 100 further includes resistors R1 to R4. The bias voltage generator 110 applies the reference bias voltage VR to the detection pins DP1 to DP4 of the first connector CN1 through the resistors R1 to R4, so that bias values VB1 to VB4 on the detection pins DP1 to DP4 are high bias values. In the embodiment, the reference bias voltage VR is, for example, a reference high voltage (a volt current condenser, VCC). In the embodiment, the resistor R1 is coupled between the reference bias voltage VR and the detection pin DP1. The resistor R2 is coupled between the reference bias voltage VR and the detection pin DP2. The resistor R3 is coupled between the reference bias voltage VR and the detection pin DP3. The resistor R4 is coupled between the reference bias voltage VR and the detection pin DP4. The bias voltage generator 110 provides the reference bias voltage VR to the detection pins DP1 to DP4 through the resistors R1 to R4. When the first connector CN1 is not connected to the second connector CN2, the bias values VB1 to VB4 on the detection pins DP1 to DP4 are raised to high bias values. In addition, a reference low voltage (for example, ground, GND) is applied to the loop pins LP1 to LP4 of the second connector CN2.

The detection circuit 120 (shown in FIG. 1) is respectively coupled to the detection pins DP1, DP2, DP3, and DP4 through nodes NET1, NET2, NET3, and NET4. Therefore, the detection circuit 120 may receive the bias values VB1 to VB4 on the detection pins DP1 to DP4 through the nodes NET1 to NET4.

It should be noted that when the bias values VB1 to VB4 on the detection pins DP1 to DP4 are shifted to low bias values (that is, the first bias values) based on a connection loop formed between the detection pins DP1 to DP4 and the loop pins LP1 to LP4, it means that the high bias values on the detection pins DP1 to DP4 are all pulled down to the low bias values by the loop pins LP1 to LP4. Therefore, the detection circuit 120 provides the first detection signal SD1.

On the other hand, when at least one of the bias values VB1 to VB4 on the detection pins DP1 to DP4 still maintains the high bias value, that is, is not shifted to the first bias value, it means that the high bias value of at least one of the detection pins DP1 to DP4 is not pulled down to the low bias value (that is, the first bias value). It may be seen that the electrical connection between at least one of the detection pins DP1 to DP4 and the corresponding loop pin is not completed. Therefore, the detection circuit 120 provides the second detection signal SD2.

In order to fully illustrate various implementations of the disclosure, other embodiments of the disclosure will be described below. It must be noted here that the following embodiments continue to use the reference numerals and some content of the above embodiment, wherein the same reference numerals are adopted to represent the same or similar elements, and the description of the same technical content is omitted. For the description of the omitted part, reference may be made to the above embodiment, which will not be repeated in the following embodiments.

Figure 4:
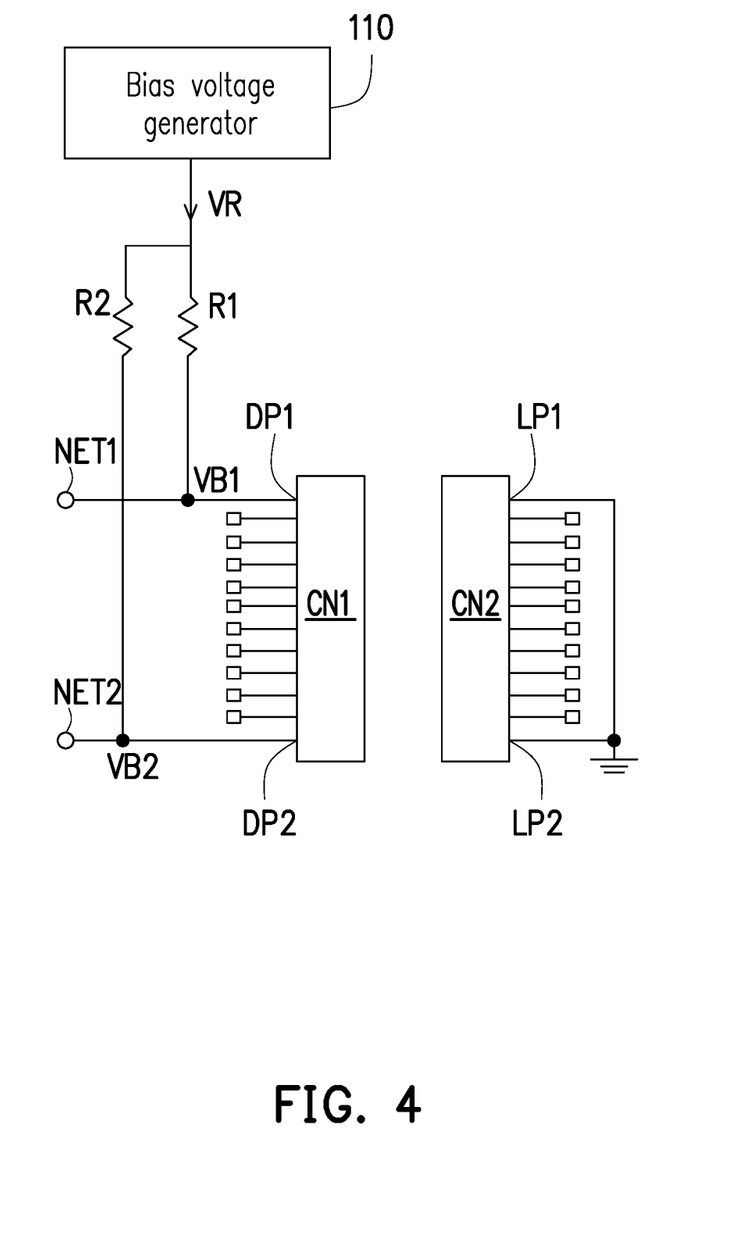
FIG. 4 is a schematic diagram of operations of a first connector, a second connector, and a bias voltage generator according to a second embodiment of the disclosure.

Please refer to FIG. 1, FIG. 3, and FIG. 4 at the same time. FIG. 4 is a schematic diagram of operations of a first connector, a second connector, and a bias voltage generator according to a second embodiment of the disclosure. The difference between the second embodiment of FIG. 4 and the first embodiment of FIG. 3 is that the first connector CN1 and the second connector CN2 of the first embodiment are double row connectors, while the first connector CN1 and the second connector CN2 of the second embodiment are single row connectors. The first connector CN1 includes the detection pins DP1 and DP2. The second connector CN2 includes the loop pins LP1 and LP2. The connection detection device 100 includes the resistors R1 and R2. The detection circuit 120 is respectively coupled to the detection pins DP1 and DP2 through the nodes NET1 and NET2.

Figure 5:
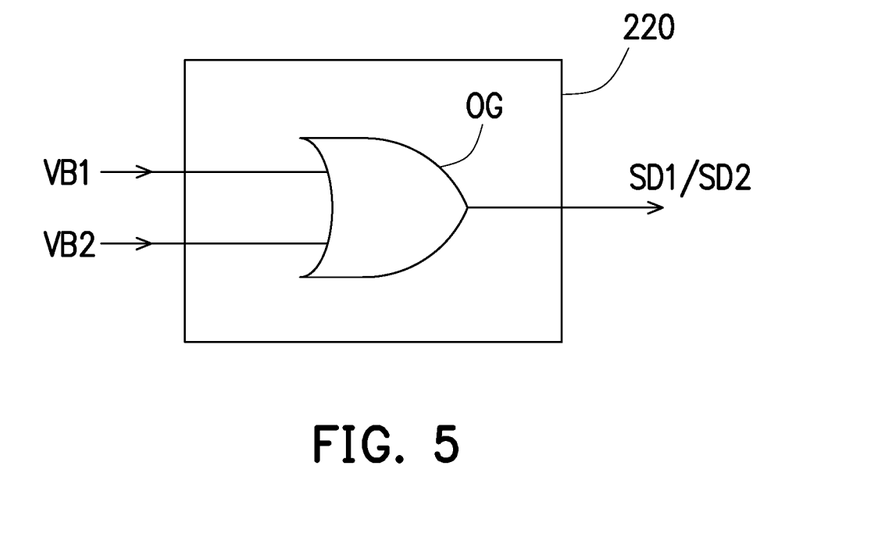
FIG. 5 is a schematic diagram of a detection circuit according to an embodiment of the disclosure.

Please refer to FIG. 4 and FIG. 5 at the same time. FIG. 5 is a schematic diagram of a detection circuit according to an embodiment of the disclosure. In the embodiment, a detection circuit 220 includes an OR gate OG. The detection circuit 220 is coupled to the detection pins DP1 and DP2 of the first connector CN1. The detection circuit 220 is used to receive the bias values VB1 and VB2 on the detection pins DP1 and DP2, and perform a logical OR operation on the bias values VB1 and VB2 to provide one of the first detection signal SD1 with a low logic level and the second detection signal SD2 with a high logic level to the processor 130 (shown in FIG. 1). In the embodiment, a first input terminal (not labelled in the drawing) of the OR gate OG receives the bias value VB1. A second input terminal (not labelled in the drawing) of the OR gate OG receives the bias value VB2. When the bias values VB1 and VB2 are both pulled down to low bias values, the OR gate OG outputs the first detection signal SD1 with the low logic level through an output terminal (not labelled in the drawing) of the OR gate OG. On the other hand, when a high bias value of at least one of the bias values VB1 and VB2 is not shifted to the low bias value, the OR gate OG outputs the second detection signal SD2 with the high logic level through the output terminal of the OR gate OG.

It should be understood that the number of input terminals of the OR gate OG of the embodiment may be determined according to the number of detection pins. Therefore, when the number of input terminals of the OR gate OG is 4, the OR gate OG may be adapted to detect the bias values VB1 to VB4 on the detection pins DP1 to DP4 shown in FIG. 3.

Figure 6:
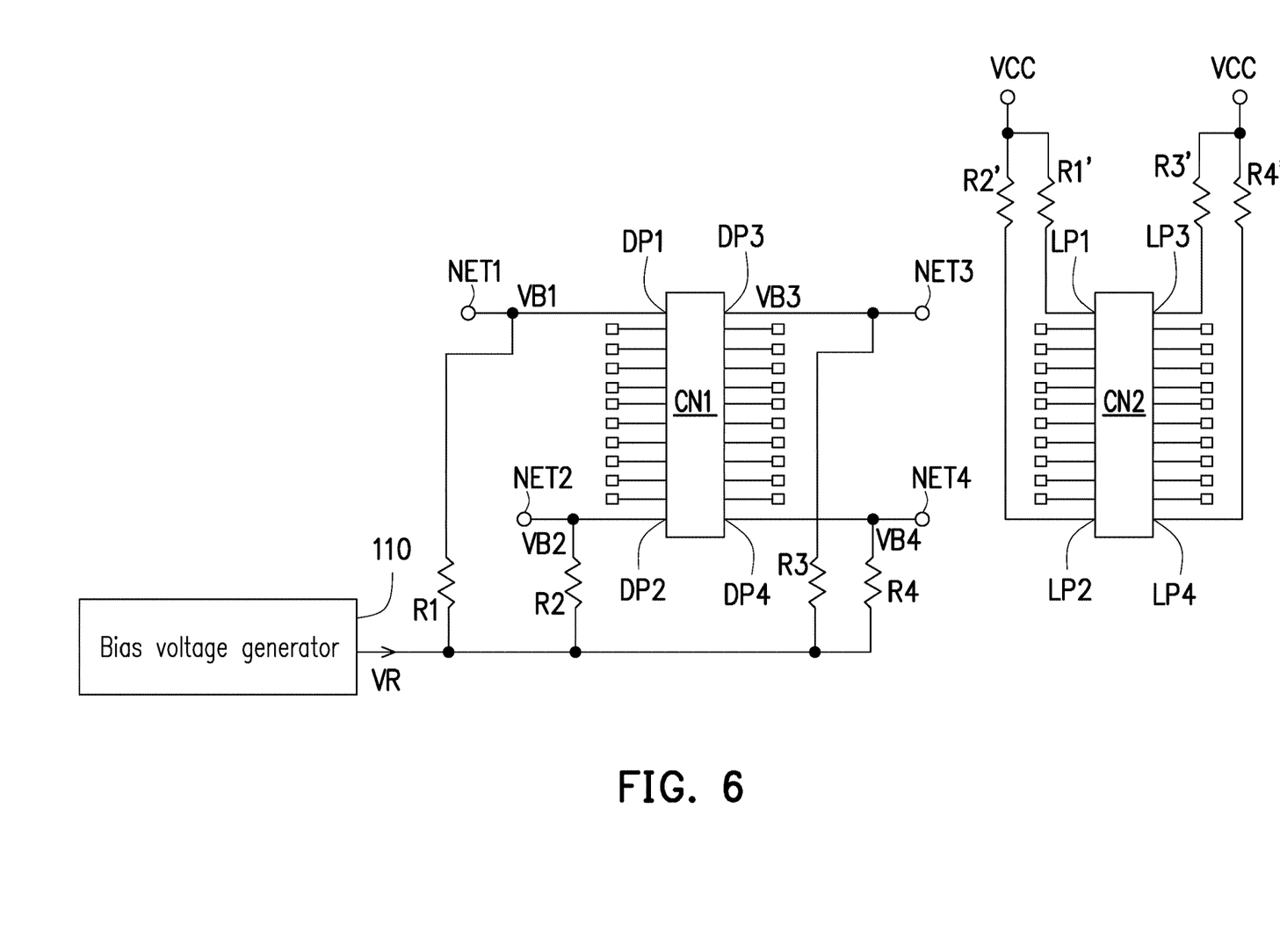
FIG. 6 is a schematic diagram of operations of a first connector, a second connector, and a bias voltage generator according to a third embodiment of the disclosure.

Please refer to FIG. 1, FIG. 3, and FIG. 6 at the same time. FIG. 6 is a schematic diagram of operations of a first connector, a second connector, and a bias voltage generator according to a third embodiment of the disclosure. The difference between the third embodiment of FIG. 6 and the first embodiment of FIG. 3 is that the loop pins LP1 to LP4 of the second connector CN2 are applied with a reference high voltage VCC. Therefore, the bias values on the loop pins LP1 to LP4 maintain high bias values. The reference high voltage VCC may be provided, for example, by a second circuit board corresponding to the second connector CN2.

The bias voltage generator 110 applies a reference bias voltage (for example, ground or a voltage signal with a low voltage value) to the detection pins DP1 to DP4 of the first connector CN1 through the resistors R1 to R4, so that the bias values VB1 to VB4 on the detection pins DP1 to DP4 are all low bias values. When the bias values VB1 to VB4 on the detection pins DP1 to DP4 are shifted to high bias values (that is, the first bias values) based on the connection loop formed between the detection pins DP1 to DP4 and the loop pins LP1 to LP4, it means that the low bias values on the detection pins DP1 to DP4 are all raised to the high bias values by the loop pins LP1 to LP4. Therefore, the detection circuit 120 provides the first detection signal SD1. On the other hand, when the bias value VB1 to VB4 on at least one of the detection pins DP1 to DP4 is not shifted to the high bias value, it means that at least one of the bias values VB1 to VB4 on the detection pins DP1 to DP4 is not raised to the high bias value. That is, the electrical connection between at least one of the detection pins DP1 to DP4 and the corresponding loop pin is not completed. Therefore, the detection circuit 120 provides the second detection signal SD2.

Taking the embodiment as an example, the second circuit board corresponding to the second connector CN2 may include, for example, resistors R1' to R4' (the disclosure is not limited thereto). The second circuit board may provide the reference high voltage VCC to the loop pins LP1 to LP4 through the resistor R1' to R4'. Resistance values of the resistors R1' to R4' are designed to be significantly lower than resistance values of the resistors R1 to R4.

Figure 7:
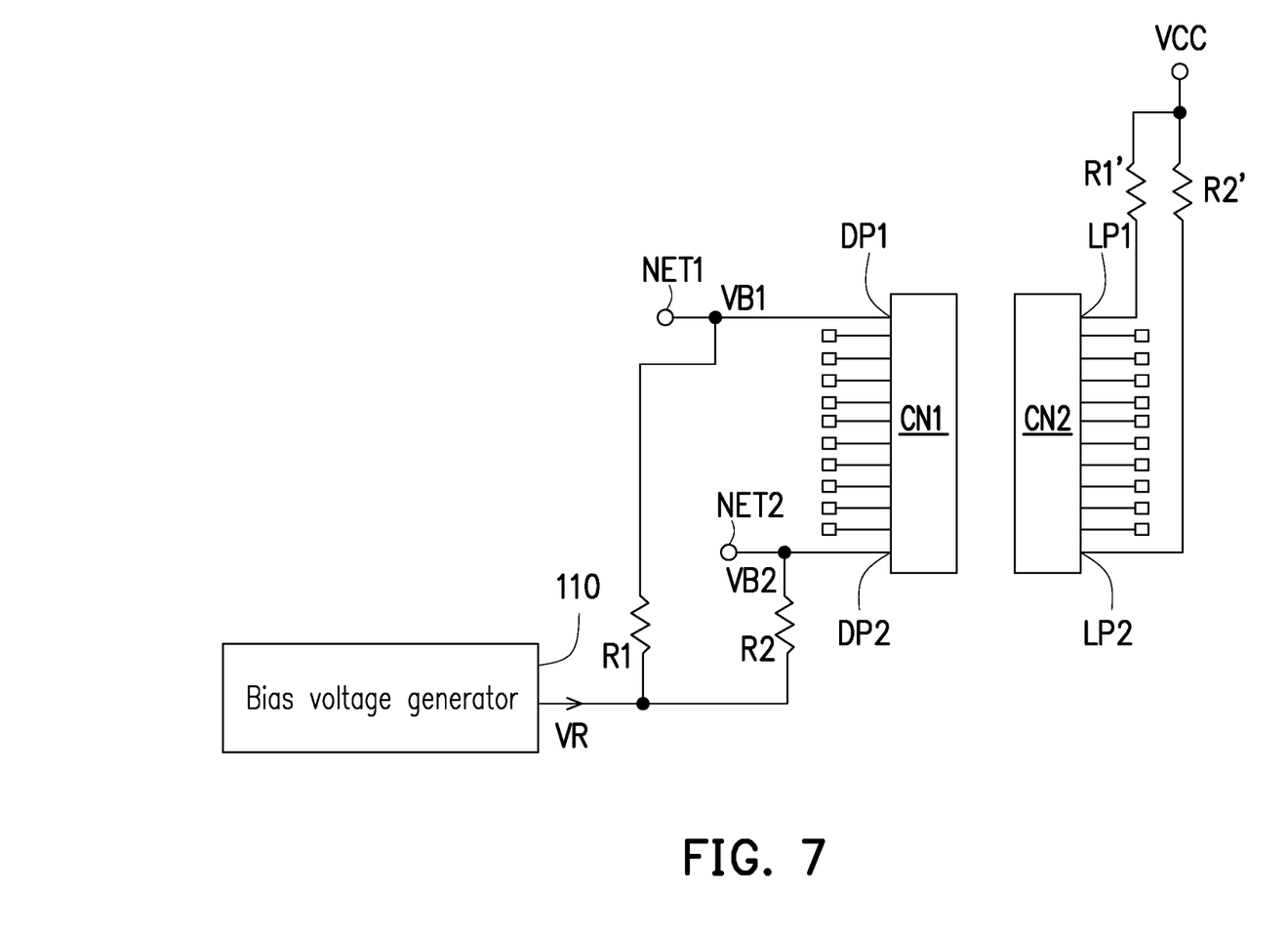
FIG. 7 is a schematic diagram of operations of a first connector, a second connector, and a bias voltage generator according to a fourth embodiment of the disclosure.

Please refer to FIG. 1, FIG. 6, and FIG. 7 at the same time. FIG. 7 is a schematic diagram of operations of a first connector, a second connector, and a bias voltage generator according to a fourth embodiment of the disclosure. The difference between the fourth embodiment of FIG. 7 and the third embodiment of FIG. 6 is that the first connector CN1 and the second connector CN2 of the third embodiment are double row connectors, while the first connector CN1 and the second connector CN2 of the fourth embodiment are single row connectors. The first connector CN1 includes the detection pins DP1 and DP2. The second connector CN2 includes the loop pins LP1 and LP2. The connection detection device 100 includes the resistors R1 and R2. The detection circuit 120 is respectively coupled to the detection pins DP1 and DP2 through the nodes NET1 and NET2. Taking the embodiment as an example, the second circuit board corresponding to the second connector CN2 may include, for example, the resistors R1' and R2' (the disclosure is not limited thereto).

Figure 8:
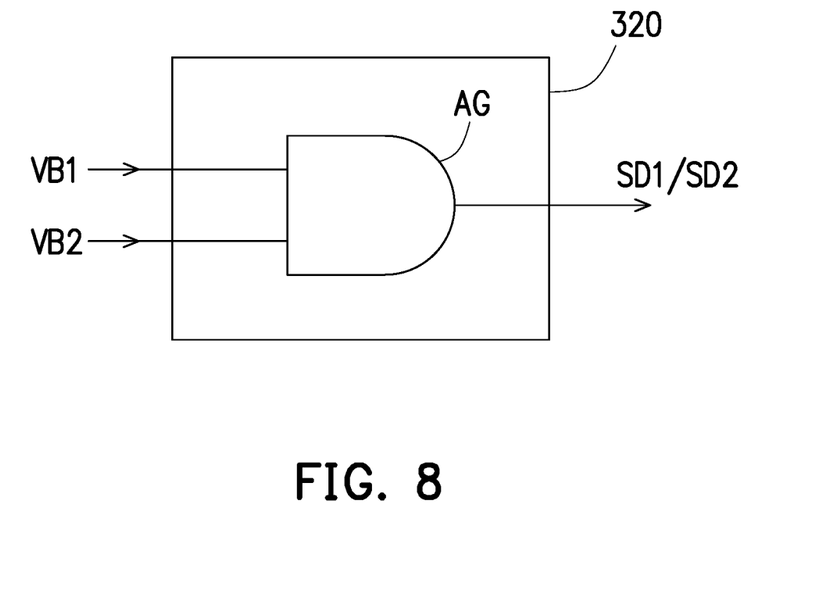
FIG. 8 is a schematic diagram of a detection circuit according to an embodiment of the disclosure.

Please refer to FIG. 7 and FIG. 8 at the same time. FIG. 8 is a schematic diagram of a detection circuit according to an embodiment of the disclosure. In the embodiment, a detection circuit 320 includes an AND gate AG. The detection circuit 320 is coupled to the detection pins DP1 and DP2 of the first connector CN1. The detection circuit 320 receives the bias values VB1 and VB2 on the detection pins DP1 and DP2, and performs a logical AND operation on the bias values VB1 and VB2 to provide one of the first detection signal SD1 with a high logic level and the second detection signals SD2 with a low logic level. In the embodiment, a first input terminal (not labelled in the drawing) of the AND gate AG receives the bias value VB1. A second input terminal (not labelled in the drawing) of the AND gate AG receives the bias value VB2. When the bias values VB1 and VB2 are both raised to high bias values, the AND gate AG outputs the first detection signal SD1 with the high logic level through an output terminal (not labelled in the drawing) of the AND gate AG. On the other hand, when a low bias value of at least one of the bias values VB1 and VB2 is not shifted to the high bias value, the AND gate AG outputs the second detection signal SD2 with the low logic level through the output terminal of the AND gate AG.

It should be understood that the number of input terminals of the AND gate AG of the embodiment may be determined according to the number of detection pins. Therefore, when the number of input terminals of the AND gate AG is 4, the AND gate AG may be adapted to detect the bias values VB1 to VB4 on the detection pins DP1 to DP4 shown in FIG. 6.

Figure 9:
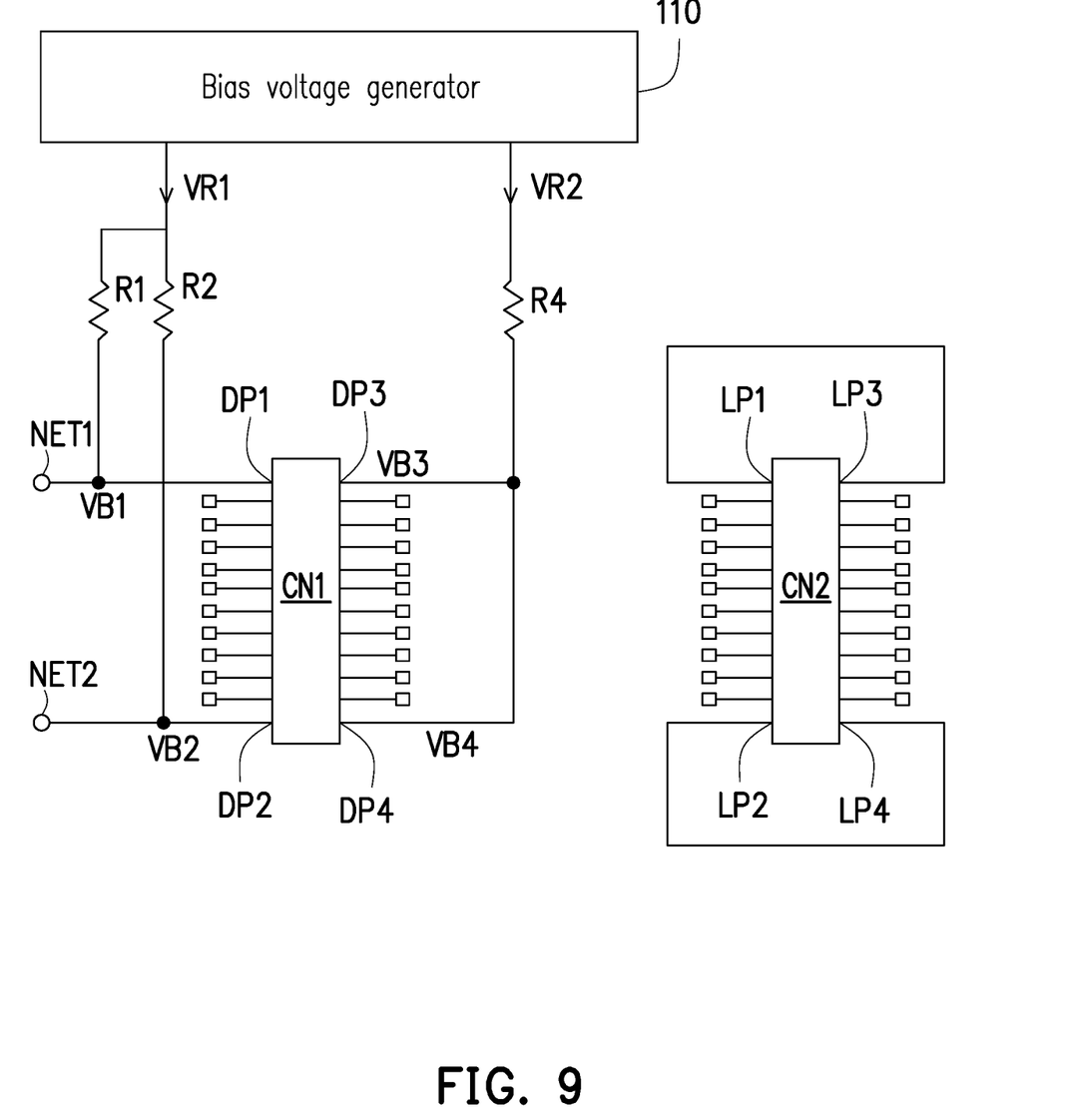
FIG. 9 is a schematic diagram of operations of a first connector, a second connector, and a bias voltage generator according to a fifth embodiment of the disclosure.

Please refer to FIG. 1, FIG. 3, and FIG. 9 at the same time. FIG. 9 is a schematic diagram of operations of a first connector, a second connector, and a bias voltage generator according to a fifth embodiment of the disclosure. The difference between the fifth embodiment of FIG. 9 and the first embodiment of FIG. 3 is that the loop pins LP1 to LP4 of the second connector CN2 include a first loop pin and a second loop pin, and the first loop pin and the second loop pin form a short circuit. For example, the loop pins LP1 and LP3 among the loop pins LP1 to LP4 of the second connector CN2 form a short circuit. The loop pins LP2 and LP4 among the loop pins LP1 to LP4 of the second connector CN2 form a short circuit.

The reference bias voltage VR includes a first reference bias voltage VR1 and a second reference bias voltage VR2. The bias voltage generator 110 applies the first reference bias voltage VR1 to the detection pins DP1 and DP2 (that is, first detection pins) through the resistors R1 and R2, so that the bias values VB1 and VB2 on the detection pins DP1 and DP2 are high bias values. The bias voltage generator 110 applies the second reference bias voltage VR2 to the detection pins DP3 and DP4 (that is, second detection pins) through the resistor R4, so that the bias values VB3 and VB4 on the detection pins DP3 and DP4 are low bias values. In the embodiment, the detection pins DP3 and DP4 may be respectively regarded as loop pins of the first connector CN1, or the detection pins DP3 and DP4 are connected to ground.

In the embodiment, the detection circuit 120 may receive the bias values VB1 and VB2 through the nodes NET1 and NET2. When the bias values VB1 and VB2 on the detection pins DP1 and DP2 are shifted to low voltage values (that is, the first bias values) based on the connection loop formed between the detection pins DP1 to DP4 and the loop pins LP1 to LP4, the detection circuit 120 provides the first detection signal SD1. Further, the bias value VB1 on the detection pin DP1 is pulled down to the low bias value based on a connection loop formed by the detection pins DP1 and DP3 and the loop pins LP1 and LP3. The bias value VB2 on the first detection pin DP2 is pulled down to the low bias value based on a connection loop formed by the detection pins DP2 and DP4 and the loop pins LP2 and LP4. Therefore, the first connector CN1 and the second connector CN2 are judged to be correctly connected. Therefore, the detection circuit 120 provides the first detection signal SD1. Further, the detection circuit 120 may provide the first detection signal SD1 in response to the low bias values of the bias values VB1 to VB4.

On the other hand, when at least one of the bias values VB1 and VB2 on the detection pins DP1 and DP2 is not shifted to the first bias value, the detection circuit 120 provides the second detection signal SD2. In the embodiment, the detection circuit 120 may be implemented by the detection circuit 220 shown in FIG. 5.

Figure 10:
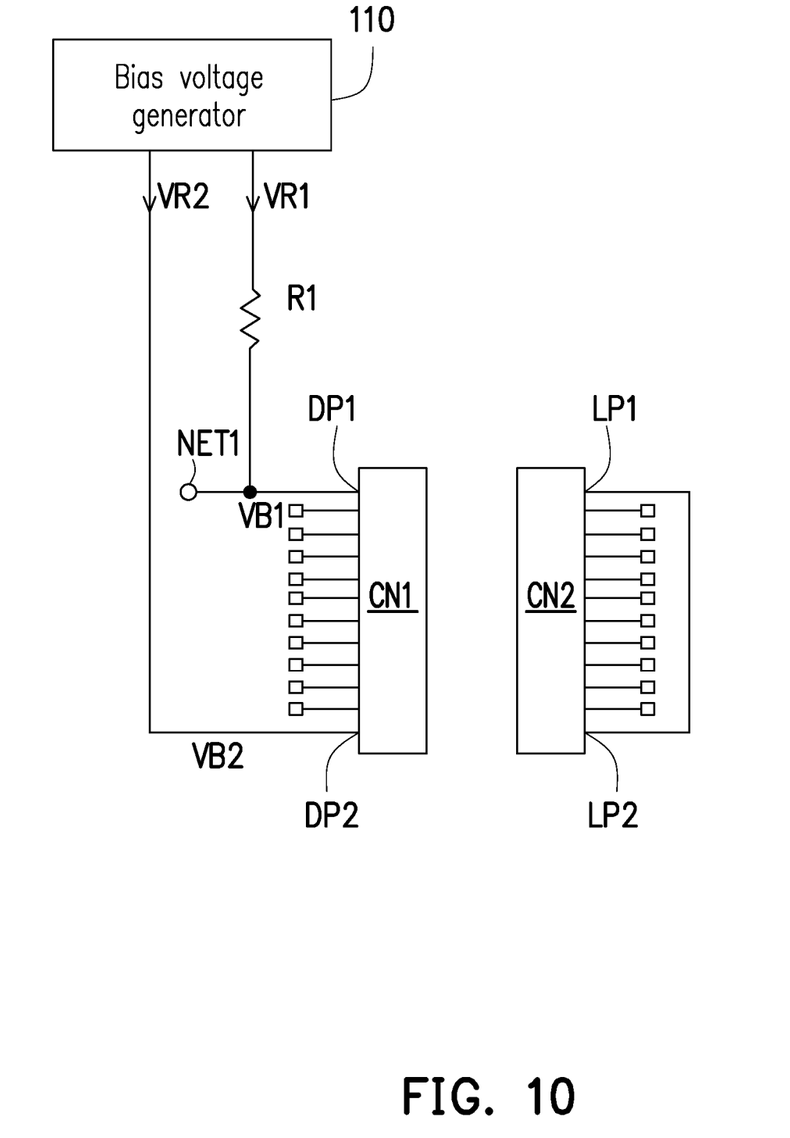
FIG. 10 is a schematic diagram of operations of a first connector, a second connector, and a bias voltage generator according to a sixth embodiment of the disclosure.

Please refer to FIG. 1, FIG. 9, and FIG. 10 at the same time. FIG. 10 is a schematic diagram of operations of a first connector, a second connector, and a bias voltage generator according to a sixth embodiment of the disclosure. The difference between the sixth embodiment of FIG. 10 and the fifth embodiment of FIG. 9 is that the first connector CN1 and the second connector CN2 of the fifth embodiment are double row connectors, while the first connector CN1 and the second connector CN2 of the sixth embodiment are single row connectors. The loop pins LP1 and LP2 of the second connector CN2 form a short circuit. The bias voltage generator 110 applies the first reference bias voltage VR1 to the detection pin DP1 (that is, the first detection pin) through the resistor R1, so that the bias value VB1 on the detection pin DP1 is a high bias value. The bias voltage generator 110 applies the second reference bias voltage VR2 to the detection pin DP2 (that is, the second detection pin), so that the bias value VB2 on the detection pin DP2 is a low bias value. In the embodiment, the detection pin DP2 may be regarded as a loop pin of the first connector CN1, or the detection pin DP2 is connected to ground.

In the embodiment, the detection circuit 120 may receive the bias value VB1 through the node NET1. When the bias value VB1 on the detection pin DP1 is shifted to a low voltage value (that is, the first bias value) based on a connection loop formed between the detection pins DP1 and DP2 and the loop pins LP1 and LP2, the detection circuit 120 provides the first detection signal SD1. On the other hand, when the bias value VB1 on the detection pin DP1 is not shifted to the first bias value, the detection circuit 120 provides the second detection signal SD2 in response to the high bias value of the bias value VB1.

Figure 11:
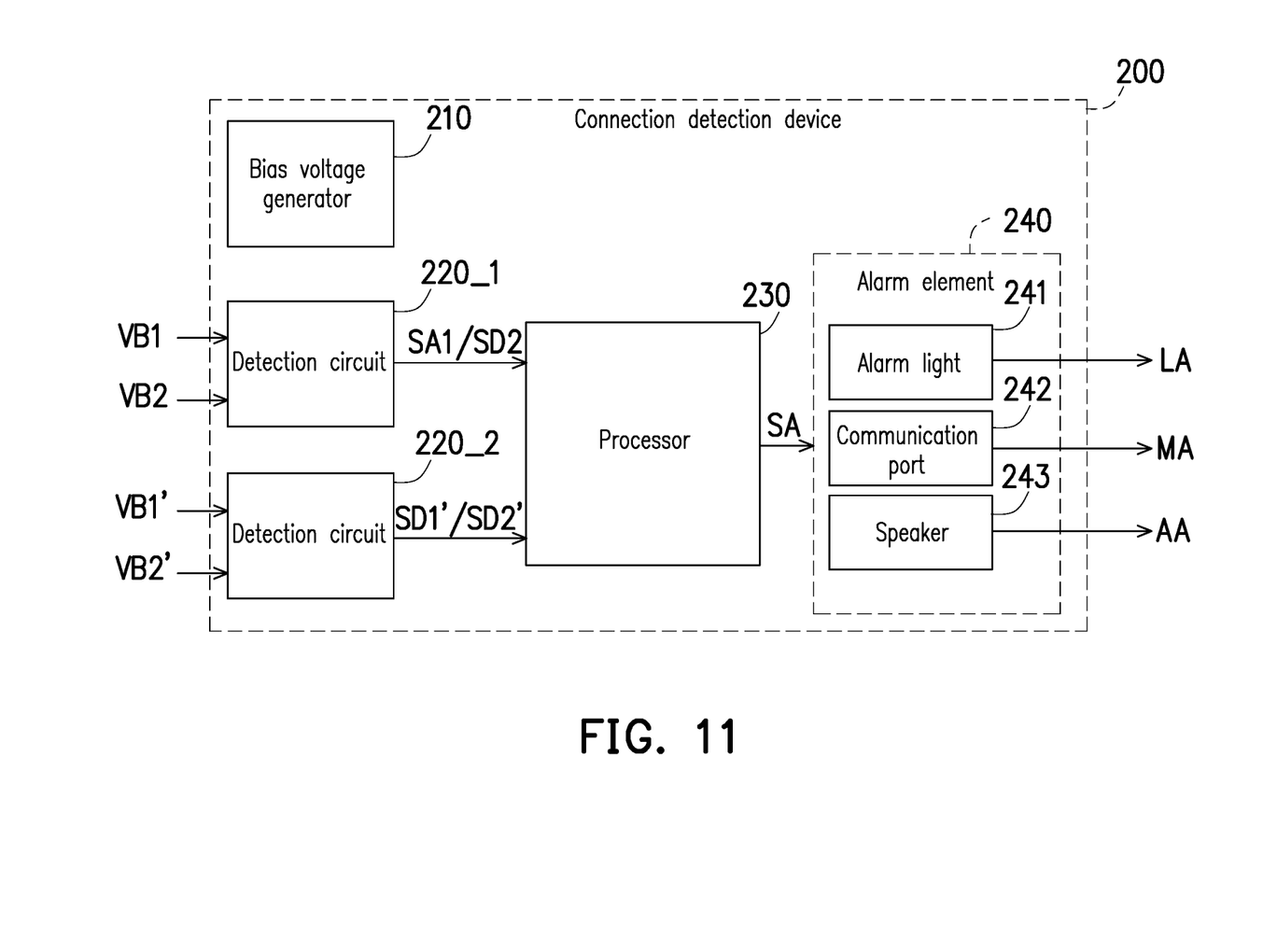
FIG. 11 is a schematic diagram of a connection detection device according to a seventh embodiment of the disclosure.

Please refer to FIG. 11. FIG. 11 is a schematic diagram of a connection detection device according to a seventh embodiment of the disclosure. In the embodiment, a connection detection device 200 includes a bias voltage generator 210, detection circuits 220_1 and 220_2, a processor 230, and an alarm element 240. The connection detection device 200 may detect a connection state between a first connector and a second connector and a connection state between a third connector and a fourth connector. The bias voltage generator 210 applies a reference bias voltage VR to detection pins of the first connector and the third connector. The detection circuit 220_1 is coupled to the detection pins of the first connector to detect bias values VB1 and VB2 on the detection pins of the first connector. When the bias values VB1 and VB2 on the detection pins are shifted to first bias values based on a connection loop formed by the first connector and the second connector, the detection circuit 220_1 provides a first detection signal SD1. On the other hand, when at least one of the bias values VB1 and VB2 is not shifted to the first bias value, the detection circuit 220_1 provides a second detection signal SD2. The detection circuit 220_2 is coupled to the detection pins of the third connector to detect bias values VB1' and VB2' on the detection pins of the third connector. When the bias values VB F and VB2' on the detection pins are shifted to the first bias values based on a connection loop formed by the third connector and the fourth connector, the detection circuit 220_2 provides the first detection signal SD1'. On the other hand, when at least one of the bias values VB F and VB2' is not shifted to the first bias value, the detection circuit 220_2 provides the second detection signal SD2'. The processor 230 is coupled to the detection circuits 220_1 and 220_2. The processor 230 provides an alarm signal SA in response to at least one of the second detection signals SD2 and SD2'. The implementation detail of the bias voltage generator 210, the detection circuits 220_1 and 220_2, and the processor 230 may be sufficiently taught in the embodiments of FIG. 1 to FIG. 10, so there will be no repetition.

In the embodiment, the alarm element 240 is coupled to the processor 230. The alarm element 240 outputs at least one of alarm information MA, an alarm light signal LA, and an alarm sound AA in response to the alarm signal SA.

Taking the embodiment as an example, the alarm element 240 includes an alarm light 241, a communication port 242, and a speaker 243. The alarm light 241 receives the alarm signal SA, and outputs the alarm light signal LA in response to the alarm signal SA. The alarm light 241 may be any form of a light emitting element or a display panel. The communication port 242 receives the alarm signal SA, and outputs the alarm information MA in response to the alarm signal SA. The communication port 242 may be a signal transmission port supporting wireless communication or wired communication. The communication port 242 may provide the alarm information MA to an external device and/or a remote device through wireless communication or wired communication. The speaker 243 receives the alarm signal SA, and outputs the alarm sound AA in response to the alarm signal SA.

In some embodiments, based on actual usage requirements, the alarm element 240 includes at least one of the alarm light 241, the communication port 242, and the speaker 243.

In summary, the embodiments of the disclosure have at least one of the following advantages or effects. In the connection detection device and the connection detection method of the disclosure, the reference bias voltage is applied to the detection pins by the bias voltage generator. When each of the bias values is shifted to the first bias value based on the connection loop formed between the detection pins and the loop pins, the detection circuit provides the first detection signal. On the other hand, when at least one of the bias values is not shifted to the first bias value, the detection circuit provides the second detection signal. The processor provides the alarm signal in response to the second detection signal. In this way, the connection detection device and the connection detection method of the disclosure can detect the connection state between the connectors through the shift of the bias values, and provide the alarm signal accordingly.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A connection detection device, used to detect a connection state between a first connector and a second connector, wherein the first connector has a first short edge and a second short edge opposite to the first short edge, and the first connector comprises a plurality of detection pins, wherein at least one of the plurality of detection pins is at least one pin closest to the first short edge, and at least another one of the plurality of detection pins is at least another one pin closest to the second short edge, and the second connector comprises a plurality of loop pins corresponding to the detection pins, the connection detection device comprising:
   a bias voltage generator, coupled to the detection pins of the first connector and configured to apply a reference bias voltage to the detection pins;
   a detection circuit, coupled to the detection pins of the first connector and configured to detect a plurality of bias values on the detection pins, wherein when each of the bias values is shifted to a first bias value based on a connection loop formed between the detection pins and the loop pins, a first detection signal is provided, and when at least one of the bias values is not shifted to the first bias value, a second detection signal is provided; and
   a processor, coupled to the detection circuit and configured to provide an alarm signal in response to the second detection signal,
   wherein the connection detection device is configured to detect whether the connection state between the first connector and the second connector is correct by the plurality of detection pins closest to the first short edge and the second short edge.

2. The connection detection device according to claim 1, wherein:
   the loop pins of the second connector are applied with a reference low voltage, and
   the connection detection device further comprises a resistor, and the bias voltage generator applies the reference bias voltage to the detection pins of the first connector through the resistor, so that the bias values on the detection pins are high bias values.

3. The connection detection device according to claim 1, wherein:
   the loop pins of the second connector are applied with a reference high voltage, and
   the connection detection device further comprises a resistor, and the bias voltage generator applies the reference bias voltage to the detection pins of the first connector through the resistor, so that the bias values on the detection pins are low bias values.

4. The connection detection device according to claim 1, further comprising:
   an alarm element, coupled to the processor and configured to output at least one of alarm information, an alarm light signal, and an alarm sound in response to the alarm signal.

5. A connection detection method, used to detect a connection between a first connector and a second connector, wherein the first connector has a first short edge and a second short edge opposite to the first short edge, and the first connector comprises a plurality of detection pins, wherein at least one of the plurality of detection pins is at least one pin closest to the first short edge, and at least another one of the plurality of detection pins is at least another one pin closest to the second short edge, and the second connector comprises a plurality of loop pins corresponding to the detection pins, the connection detection method comprising:
   applying a reference bias voltage to the detection pins by a bias voltage generator;
   detecting a plurality of bias values on the detection pins by a detection circuit;
   when each of the bias values is shifted to a first bias value based on a connection loop formed between the detection pins and the loop pins, providing a first detection signal;
   when at least one of the bias values is not shifted to the first bias value, providing a second detection signal;
   providing an alarm signal in response to the second detection signal by a processor; and
   detecting whether a connection state between the first connector and the second connector is correct by the plurality of detection pins closest to the first short edge and the second short edge.

6. The connection detection method according to claim 5, further comprising:
   applying a reference low voltage to the loop pins; and
   applying the reference bias voltage to the detection pins through a resistor, so that the bias values on the detection pins are high bias values.

7. The connection detection method according to claim 6, wherein:
   when each of the high bias values on the detection pins is shifted to the first bias value based on the connection loop formed between the detection pins and the loop pins, the first detection signal is provided, and when the high bias value on at least one of the detection pins is not shifted to the first bias value, the second detection signal is provided.

8. The connection detection method according to claim 5, further comprising:

applying a reference high voltage to the loop pins; and applying the reference bias voltage to the detection pins through a resistor, so that the bias values on the detection pins are low bias values.

9. The connection detection method according to claim 8, wherein:

when each of the low bias values on the detection pins is shifted to the first bias value based on the connection loop formed between the detection pins and the loop pins, the first detection signal is provided, and when the low bias value on at least one of the detection pins is not shifted to the first bias value, the second detection signal is provided.

10. The connection detection method according to claim 5, further comprising:

forming a short circuit between a first loop pin and a second loop pin among the loop pins;

applying a first reference bias voltage to a first detection pin among the detection pins through a resistor, so that a bias value on the first detection pin is a high bias value; and applying a second reference bias voltage to a second detection pin among the detection pins, so that a bias value on the second detection pin is a low bias value.

11. The connection detection method according to claim 10, wherein:

when the high bias value on the first detection pin is shifted to the first bias value based on the connection loop formed between the detection pins and the loop pins, the first detection signal is provided, and when the high bias value on the first detection pin is not shifted to the first bias value, the second detection signal is provided.

12. A connection detection device, used to detect a connection state between a first connector and a second connector, wherein the first connector comprises a plurality of detection pins, and the second connector comprises a plurality of loop pins corresponding to the detection pins, the connection detection device comprising:

a bias voltage generator, coupled to the detection pins of the first connector and configured to apply a reference bias voltage to the detection pins;

a detection circuit, coupled to the detection pins of the first connector and configured to detect a plurality of bias values on the detection pins, wherein when each of the bias values is shifted to a first bias value based on a connection loop formed between the detection pins and the loop pins, a first detection signal is provided, and when at least one of the bias values is not shifted to the first bias value, a second detection signal is provided; and a processor, coupled to the detection circuit and configured to provide an alarm signal in response to the second detection signal, wherein the loop pins of the second connector are applied with a reference low voltage, and the connection detection device further comprises a resistor, and the bias voltage generator applies the reference bias voltage to the detection pins of the first connector through the resistor, so that the bias values on the detection pins are high bias values, wherein when each of the high bias values on the detection pins is shifted to the first bias value based on the connection loop formed between the detection pins and the loop pins, the detection circuit provides the first detection signal, and when the high bias value on at least one of the detection pins is not shifted to the first bias value, the detection circuit provides the second detection signal.

13. A connection detection device, used to detect a connection state between a first connector and a second connector, wherein the first connector comprises a plurality of detection pins, and the second connector comprises a plurality of loop pins corresponding to the detection pins, the connection detection device comprising:

a bias voltage generator, coupled to the detection pins of the first connector and configured to apply a reference bias voltage to the detection pins;

a detection circuit, coupled to the detection pins of the first connector and configured to detect a plurality of bias values on the detection pins, wherein when each of the bias values is shifted to a first bias value based on a connection loop formed between the detection pins and the loop pins, a first detection signal is provided, and when at least one of the bias values is not shifted to the first bias value, a second detection signal is provided; and a processor, coupled to the detection circuit and configured to provide an alarm signal in response to the second detection signal, wherein the loop pins of the second connector are applied with a reference low voltage, and the connection detection device further comprises a resistor, and the bias voltage generator applies the reference bias voltage to the detection pins of the first connector through the resistor, so that the bias values on the detection pins are high bias values, wherein the detection circuit comprises:

an OR gate, coupled to the detection pins and configured to receive the bias values on the detection pins, and perform a logical OR operation on the bias values to provide one of the first detection signal with a low logic level and the second detection signal with a high logic level.

14. A connection detection device, used to detect a connection state between a first connector and a second connector, wherein the first connector comprises a plurality of detection pins, and the second connector comprises a plurality of loop pins corresponding to the detection pins, the connection detection device comprising:

a bias voltage generator, coupled to the detection pins of the first connector and configured to apply a reference bias voltage to the detection pins;

a detection circuit, coupled to the detection pins of the first connector and configured to detect a plurality of bias values on the detection pins, wherein when each of the bias values is shifted to a first bias value based on a connection loop formed between the detection pins and the loop pins, a first detection signal is provided, and when at least one of the bias values is not shifted to the first bias value, a second detection signal is provided; and a processor, coupled to the detection circuit and configured to provide an alarm signal in response to the second detection signal, wherein:

the loop pins of the second connector are applied with a reference high voltage, and the connection detection device further comprises a resistor, and the bias voltage generator applies the reference bias voltage to the detection pins of the first connector through the resistor, so that the bias values on the detection pins are low bias values, wherein when each of the low bias values on the detection pins is shifted to the first bias value based on the connection loop formed between the detection pins and the loop pins, the detection circuit provides the first detection signal, and when the low bias value on at least one of the detection pins is not shifted to the first bias value, the detection circuit provides the second detection signal.

15. A connection detection device, used to detect a connection state between a first connector and a second connector, wherein the first connector comprises a plurality of detection pins, and the second connector comprises a plurality of loop pins corresponding to the detection pins, the connection detection device comprising:

a bias voltage generator, coupled to the detection pins of the first connector and configured to apply a reference bias voltage to the detection pins;

a detection circuit, coupled to the detection pins of the first connector and configured to detect a plurality of bias values on the detection pins, wherein when each of the bias values is shifted to a first bias value based on a connection loop formed between the detection pins and the loop pins, a first detection signal is provided, and when at least one of the bias values is not shifted to the first bias value, a second detection signal is provided; and a processor, coupled to the detection circuit and configured to provide an alarm signal in response to the second detection signal, wherein:

the loop pins of the second connector are applied with a reference high voltage, and the connection detection device further comprises a resistor, and the bias voltage generator applies the reference bias voltage to the detection pins of the first connector through the resistor, so that the bias values on the detection pins are low bias values, wherein the detection circuit comprises:

an AND gate, coupled to the detection pins and configured to receive the bias values on the detection pins, and perform a logical AND operation on the bias values to provide one of the first detection signal with a high logic level and the second detection signal with a low logic level.

16. A connection detection device, used to detect a connection state between a first connector and a second connector, wherein the first connector comprises a plurality of detection pins, and the second connector comprises a plurality of loop pins corresponding to the detection pins, the connection detection device comprising:

a bias voltage generator, coupled to the detection pins of the first connector and configured to apply a reference bias voltage to the detection pins;

a detection circuit, coupled to the detection pins of the first connector and configured to detect a plurality of bias values on the detection pins, wherein when each of the bias values is shifted to a first bias value based on a connection loop formed between the detection pins and the loop pins, a first detection signal is provided, and when at least one of the bias values is not shifted to the first bias value, a second detection signal is provided; and a processor, coupled to the detection circuit and configured to provide an alarm signal in response to the second detection signal, wherein:

the loop pins of the second connector comprise a first loop pin and a second loop pin, and the first loop pin and the second loop pin form a short circuit, and the connection detection device further comprises a resistor, the detection pins of the first connector comprise a first detection pin and a second detection pin, the reference bias voltage comprises a first reference bias voltage and a second reference bias voltage, the bias voltage generator applies the first reference bias voltage to the first detection pin through the resistor, so that a bias value on the first detection pin is a high bias value, and applies the second reference bias voltage to the second detection pin, so that a bias value on the second detection pin is a low bias value.

17. The connection detection device according to claim 16, wherein:

when the high bias value on the first detection pin is shifted to the first bias value based on the connection loop formed between the detection pins and the loop pins, the detection circuit provides the first detection signal, and when the high bias value on the first detection pin is not shifted to the first bias value, the detection circuit provides the second detection signal.

18. The connection detection device according to claim 16, wherein the detection circuit comprises:

an OR gate, coupled to the detection pins and configured to receive the bias values on the detection pins, and perform a logical OR operation on the bias values to provide one of the first detection signal with a low logic level and the second detection signal with a high logic level.

* * * * *